W. E. CARLETON.
MOTION PICTURE SHUTTER.
APPLICATION FILED APR. 22, 1915.
1,173,706.
Patented Feb. 29, 1916.
2 SHEETS—SHEET 1.
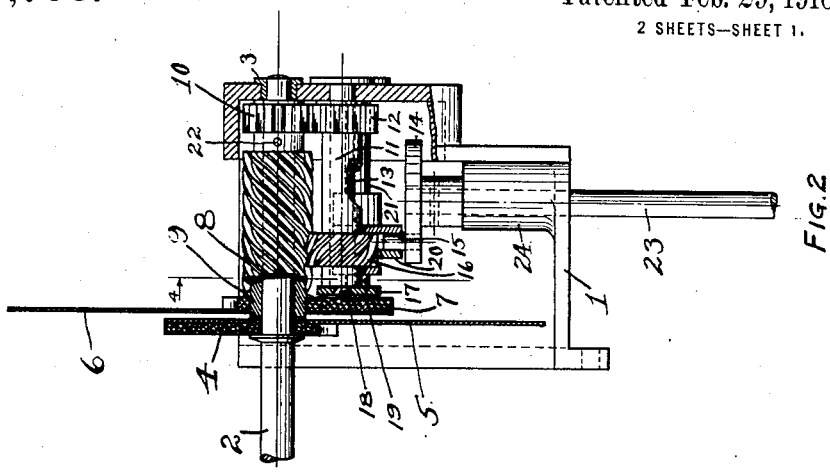
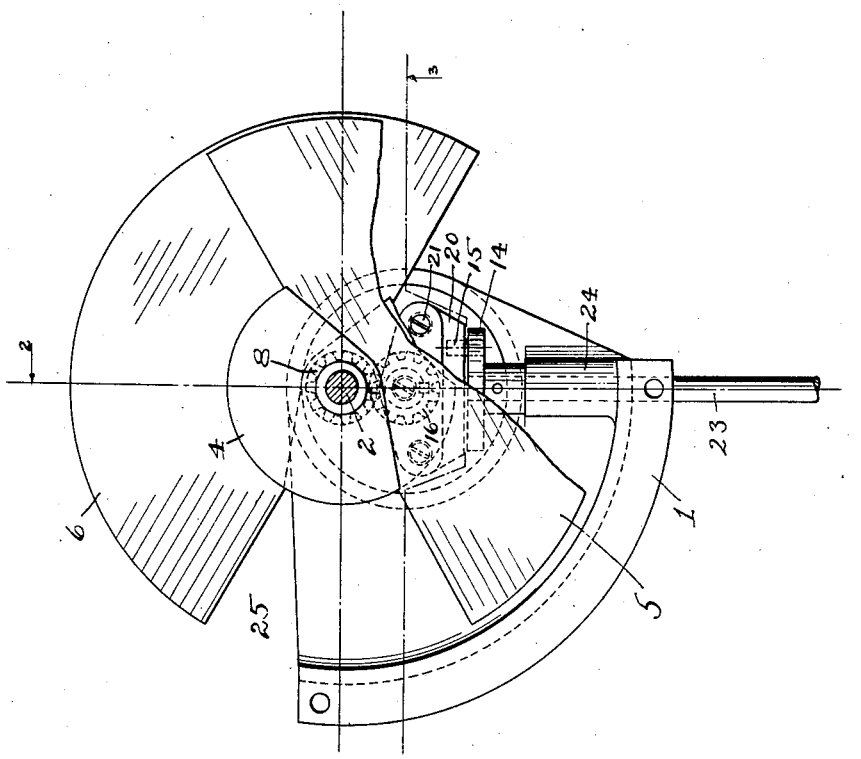
INVENTOR
Walter E. Carleton
BY
Lewis J. Doolittle
ATTORNEY

UNITED STATES PATENT OFFICE.

WALTER E. CARLETON, OF BROOKLYN, NEW YORK.

MOTION-PICTURE SHUTTER.

1,173,706.  Specification of Letters Patent.  Patented Feb. 29, 1916.

Application filed April 22, 1915. Serial No. 22,994.

*To all whom it may concern:*

Be it known that I, WALTER E. CARLETON, a citizen of the United States, residing at Brooklyn, in the county of Kings, city and State of New York, have invented new and useful Improvements in Motion-Picture Shutters, of which the following is a specification.

My invention relates to a motion picture shutter and has for its primary object to provide a construction characterized by superior simplicity and efficiency and having a capacity for regulation of the angular position and the shutter blades of the opening between them, within limits that can be adjusted at will to meet the requirements of every possible range of conditions that may arise in practice.

A preferred embodiment of my invention is illustrated on the accompanying drawings, wherein the same characters of reference are employed to indicate the same parts throughout the several views.

Figure 4:
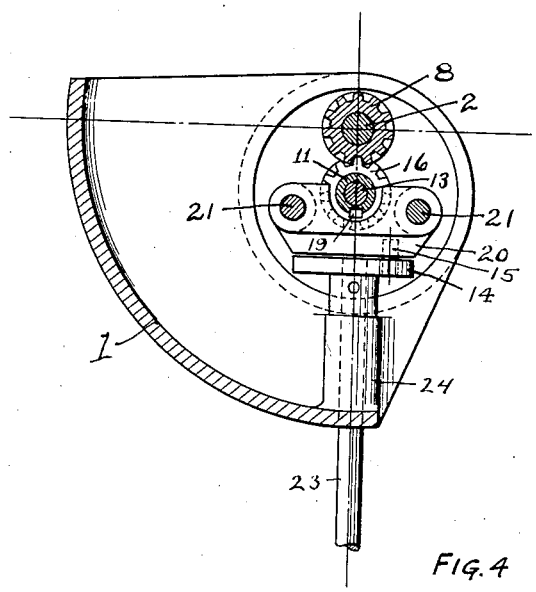
Figure 3:
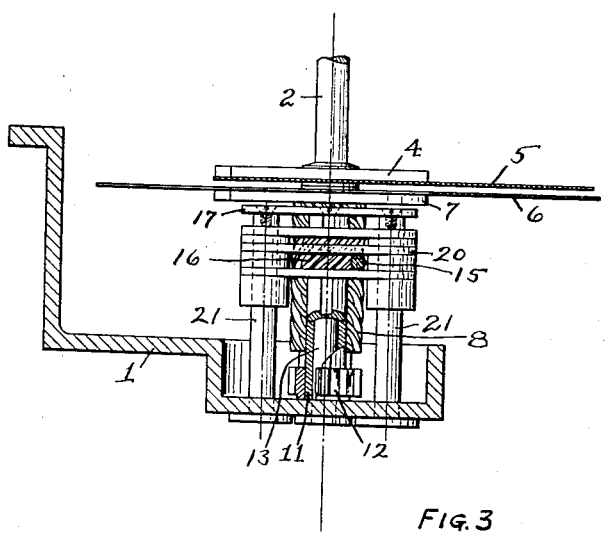

On said drawings Figure 1 is a front elevation. Fig. 2 is a longitudinal section through the center of the mechanism. Fig. 3 is a part section and plan view showing the mechanism. Fig. 4 is a transverse section through line 4 taken in back of the shutter blades to show the cross head.

Referring particularly to the drawings, I utilize a suitably shaped frame 1 so constructed as to be adaptable to the various motion picture machines now in use and in this frame is fastened or set a bearing bushing 3 for the purpose of supporting the one end of shaft 2. The other end of this driving shaft 2 is extended longitudinally toward the machine and is long enough to be coupled with the proper source of power in the motion picture machine. On this driving shaft is mounted and rigidly fastened thereto a shutter hub 4 carrying the shutter blade 5 which is rigidly fastened to the shutter hub 4. This particular shutter blade and hub is usually known as the front shutter. The rear shutter blade 6 is mounted and rigidly connected to the shutter hub 7 which is mounted on a spiral gear 8 and free to revolve in a vertical plane around driving shaft 2 but is fastened or keyed to the spiral gear shank 9. A spiral gear 8 is revolubly mounted on the driving shaft and free to rotate independent of the said driving shaft 2. Adjacent to this spiral gear 8 and mounted on the same driving shaft is a driving gear 10. This gear is either pinned or rigidly fastened in place on the driving shaft, in this case shown by a pin 22, or it may be fastened by a key instead. In mesh with this driving gear is a driven gear 12 and rigidly connected to a driving sleeve 11 which is revolubly mounted on a bearing pin 13 and is held in place on this bearing pin by means of a washer 17 and a screw 18 or any method that may be desired. The bearing pin 13 is longitudinally mounted in the frame 1 and held there rigidly and parallel to driving shaft 2. This driving sleeve is furnished with a key-way and key 19 for holding the spiral gear 16 which is in mesh with the spiral gear 8 in a certain angular relation with the driven gear 12. This spiral gear 16, though being fixed with relation to its transverse plane and the transverse plane of driven gear 12, it is free to move in a longitudinal plane upon the driving sleeve and parallel to the driving shaft 2, but it is governed or rather its longitudinal location is fixed by means of a carriage or crosshead, also free to move in this longitudinal plane, the crosshead being held in a horizontal position by the guide pins 21. These pins are rigidly fixed in frame 1 extending out from the frame and in a parallel line to the shaft 2, the longitudinal motion of the crosshead being governed by the radial movement of a pin 15 which engages in a socket or slot on the crosshead. This pin 15 is eccentrically mounted on an operating hub 14, both of which revolve in a horizontal plane around the center of an operating shaft 23 to which they are rigidly fastened. This operating shaft revolves in a bearing 24 mounted in or a part of the frame 1 and is so shaped as to keep the hub and pin in contact with the socket on the crosshead.

It is obvious that while the shutters are rotating and the gears remain in one particular set of fixed positions, that the shutters will likewise remain in a fixed position, but should this release be disturbed by rotating shaft 23 in a horizontal plane and pin 15 would rigidly move in that same plane, it would force the crosshead 20 and carry with it the spiral gear 16 in a lateral or longitudinal plane, and being in mesh with the spiral gear 8 and also in mesh or in fixed relation with the gears 10 and 12 and therefore in a fixed relation with shaft 2. It is obvious then, that by sliding this said gear 16 along in the longitudinal plane that the fixed relation of 8 must naturally be changed as they are rotating at the same speed plus the additional advance to be made on a spiral tooth by the movement of the spiral gear 16 and the advancing position on the teeth of the spiral gear 16 and the advancing position on the teeth of the spiral gear 8, the shutter 6 naturally being in fixed relation with the spiral gear 8 must change its position with relation to a fixed point on a transverse plane of shaft 2 and it now follows that front shutter blade 5 being fixed to the driving shaft changes its relation to the rear shutter blade 6 and therefore changes the distance between the shutter blades known as opening 25.

Having thus described my invention, what I claim as new and desire to secure and protect by Letters Patent of the United States is:—

1. In a motion picture shutter, the combination of a frame, a driving shaft having a spiral gear rotatably mounted thereon, a shutter blade carried by said driving shaft, a shutter blade carried by said spiral gear, a counter shaft, said driving and counter shafts having intermeshing fixed gears, a spiral gear movable longitudinally upon said counter shaft but not rotatable thereon and intermeshing with the first spiral gear, and means for moving said second spiral gear upon the counter shaft for varying the angular position of the shutter blades.

2. In a motion picture shutter, the combination of a frame, a driving shaft having a spiral gear rotatably mounted thereon, a shutter blade carried by said driving shaft, a shutter blade carried by said spiral gear, a fixed gear carried by the driving shaft, a counter shaft having a fixed gear intermeshing with the first fixed gear, a spiral gear mounted upon the counter shaft and meshing with the first spiral gear, and means for moving the second spiral gear during engagement with first spiral gear transversely so as to vary the angular position of the shutter blades.

3. In a motion picture shutter, the combination of a frame, a driving shaft having a spiral gear rotatably mounted thereon, a shutter blade carried by said driving shaft, a shutter blade carried by said spiral gear, a fixed gear carried by the driving shaft, a counter shaft having a sleeve rotatably mounted thereon, a gear fixed upon the sleeve intermeshing with the first fixed gear, a spiral gear mounted upon the sleeve intermeshing with the first spiral gear, said second spiral gear being movable longitudinally upon said sleeve but not rotatable thereon, and means for shifting the position of the spiral gear upon the sleeve to vary the angular position of the shutter blades.

4. In a motion picture shutter, the combination of a frame, a driving shaft rotatably mounted therein, a spiral gear rotatably mounted upon said shaft, a shutter blade carried by said driving shaft, a shutter blade carried by said spiral gear, a counter shaft, gears fixed upon the driving and counter shafts which intermesh with each other, a spiral gear mounted upon the counter shaft and intermeshing with the first spiral gear, said second spiral gear being slidable longitudinally upon the counter shaft but not rotatable thereon, a crosshead straddling said second spiral gear, and means engaging said crosshead for moving the spiral gear longitudinally of the counter shaft whereby the angular position of the shutter blades is varied.

5. In a motion picture shutter, the combination of a frame, a driving shaft rotatably mounted therein, a spiral gear rotatably mounted upon said shaft, a counter shaft, a shutter blade carried by said driving shaft, a shutter blade carried by said spiral gear, a sleeve rotatably mounted upon the latter, gears fixed upon the driving shaft and sleeve, said gears intermeshing with each other, a spiral gear mounted upon said sleeve and intermeshing with the first spiral gear, said second spiral gear being movable longitudinally on the sleeve but not rotatable thereon, and means for moving said second spiral gear longitudinally upon the counter shaft whereby the angular position of the shutter blades is varied.

6. In a motion picture shutter, the combination of a frame, a driving shaft rotatably mounted therein and having a spiral gear rotatably mounted thereon, a shutter blade carried by said driving shaft, a shutter blade carried by said spiral gear, a fixed gear carried by the driving shaft, a counter shaft, a sleeve rotatably mounted upon the latter, a fixed gear mounted upon the sleeve and intermeshing with the first fixed gear, a spiral gear mounted upon the sleeve and intermeshing with the first spiral gear, said second spiral gear being longitudinally movable upon the counter shaft but not rotatable thereon, a movable cross head straddling the second spiral gear, a vertical shaft rotatably mounted in the frame, a disk upon the upper end of said vertical shaft, a pin upstanding from said disk and eccentrically located thereon, said pin engaging the cross head, whereby the position of the second spiral gear is shifted upon the sleeve upon the rotation of the vertical shaft and the angular position of the shutter blade is varied.

7. In a motion picture shutter, the combination of a frame, a driving shaft rotatably mounted therein, a spiral gear rotatably mounted thereon, a shutter blade carried by said driving shaft, a shutter blade carried by said spiral gear, a counter shaft, a sleeve rotatably mounted upon the latter, gears fixed upon said counter shaft and driving shaft which intermesh with each other, a spiral gear mounted upon said counter shaft and intermeshing with the first spiral gear, said second spiral gear being movable longitudinally on the sleeve but not rotatable thereon, a cross head straddling said second spiral gear, a vertical shaft rotatably mounted in said frame, a disk mounted upon the upper end of said vertical shaft, a pin projecting from said disk engaging said cross head and adapted to move the second spiral gear longitudinally upon the counter shaft upon the rotation of said vertical shaft whereby the angular position of the shutter blade is varied.

In testimony whereof I affix my signature in the presence of two witnesses.

WALTER E. CARLETON.

Witnesses:
    Lewis J. Doolittle,
    Percival E. Jackson.